UNITED STATES PATENT OFFICE.

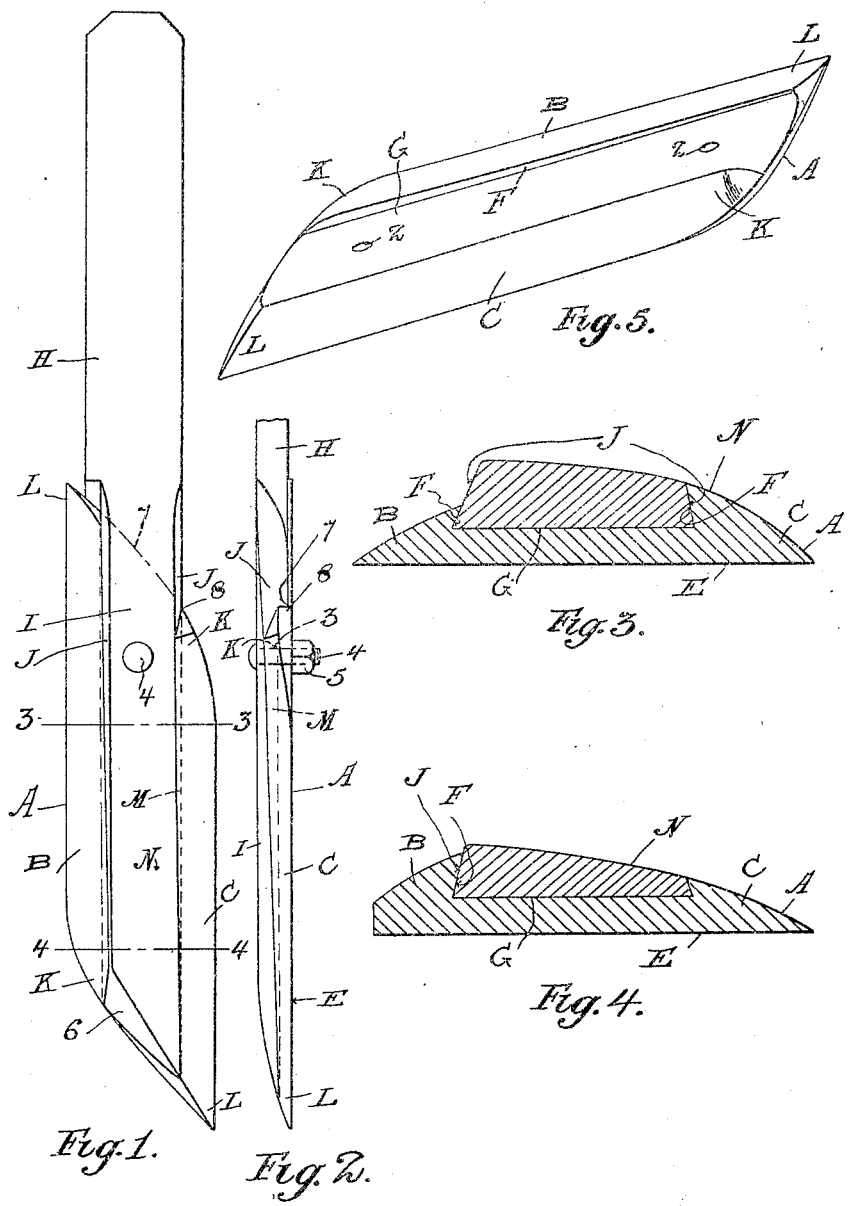

ALEXANDER McCACHEN, OF DUNBARTON, ONTARIO, CANADA.

REVERSIBLE COLTER.

1,381,576.   Specification of Letters Patent.   Patented June 14, 1921.

Application filed April 10, 1920. Serial No. 372,775.

*To all whom it may concern:*

Be it known that I, ALEXANDER McCACHEN, a subject of the King of Great Britain, of the town of Dunbarton, in the county of Ontario, Province of Ontario, Canada, have invented certain new and useful Improvements in Reversible Colters, of which the following is a specification.

My invention relates to improvements in reversible colters, and one object of my invention is to provide a colter of the type set forth which has two oppositely disposed cutting edges, the active cutting blade having a surface shaped to merge into the outer surface of the lower portion of the shank so that the said lower portion and the colter will not offer undue resistance in passing through the soil. Another object of the invention is the particular manner in which the colter is associated with the shank, and yet without interfering in any manner whatsoever with the ordinary manner of coupling the shank to a plow beam. A still further object of the invention is to provide only one nut and bolt to securely lock the colter against longitudinal displacement on the shank, in the preferred form of construction.

My preferred form of colter comprises a blade having two oppositely-disposed cutting edges, dove-tailed for its whole length in one side thereof to receive the lower portion of the shank which is suitably formed to fit therewith, as hereinafter more particularly set forth.

Figure 1 is an elevation of one side of my preferred form of colter, showing the same coupled to the shank. Fig. 2 is a front edge view of the major portion of my device. Figs. 3 and 4 are cross sections on the lines 3—3, 4—4, respectively, Fig. 1, and Fig. 5 is a perspective view of the colter.

In the drawings, like characters of reference refer to the same parts.

A is the colter, and the same comprises one blade having two oppositely-disposed cutting edges B and C. Upon referring particularly to Figs. 2, 3, and 4, it will be seen that the side E of the colter is substantially flat, thus reducing to a minimum the resistance this side will offer in passing through the soil.

Formed longitudinally in a colter A, as shown clearly in Figs. 3 and 4, is a dove-tailed slot G. H is the shank, and the lower portion I thereof is provided with beveled edges J which interfit with the inner edges F of the dove-tailed slot G, when the same is mounted on the shank.

Upon referring particularly to Figs. 3, 4, and 5, it will be observed that the cutting edges B and C are oppositely disposed and that they are tapered from each end K to the opposite ends L. It will also be seen upon referring particularly to Fig. 2 that the forward edges M of the lower portion I of the shank H is tapered, and the result is that when the colter is placed on the shank, a smooth backwardly curved surface N is provided, which surface will offer the minimum resistance to the soil in passing therethrough.

In each end of the colter A is formed a hole 2, and each of these holes in turn alines with a hole 3 formed in the lower portion I of the shank H, and in this hole is mounted a bolt 4 provided with a nut 5. The elements 4 and 5, mounted as described, positively prevent the longitudinal displacement of the colter on its shank.

It will be understood by one skilled in the art that when one of the cutting edges gets dull, the colter can be easily removed and replaced in inverted position ready for immediate use.

Obviously, the colter A and the shank H, particularly the lower portion thereof, will be neatly designed, and the construction will be lightened in any manner desired without sacrificing the principle of the invention; for example, if desired the lower end of the lower portion I may be chamfered as shown at 6.

One side of the shank is preferably provided with a shoulder 7 offset from the lower portion I against which the upper end 8 of the colter strikes, thereby insuring that the desired hole 2 will be brought into alinement with the hole 3.

While I have described what I consider to be the best embodiment of my invention, still I desire it to be understood that the principle may be embodied in different forms, and I desire not to be limited beyond the requirements of the prior art and the terms of my claims.

What I claim is,

1. As a new article of manufacture a reversible colter comprising a blade having two oppositely-disposed cutting edges dove-tailed for its whole length in one side thereof, each of the said edges being rounded to a point, the points lying diagonally to each other.

2. In combination a reversible colter comprising a blade having two oppositely-disposed cutting edges dove-tailed for its whole length in one side thereof, each of the said edges being rounded to a point, the points lying diagonally to each other, and a shank formed to fit said dove-tailed groove and adapted to be removably coupled to said blade.

ALEXANDER McCACHEN.